2 Sheets—Sheet 1.
S. S. HOGLE.
Revolving Harrow.
No. 30,554.
Patented Oct. 30, 1860.
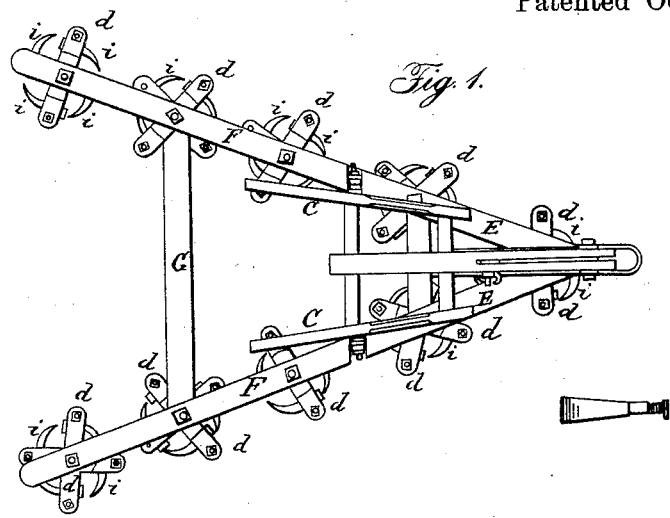
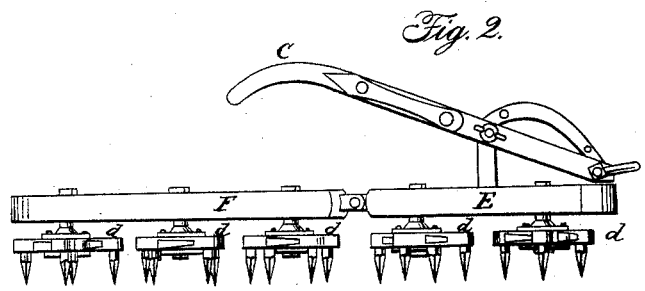
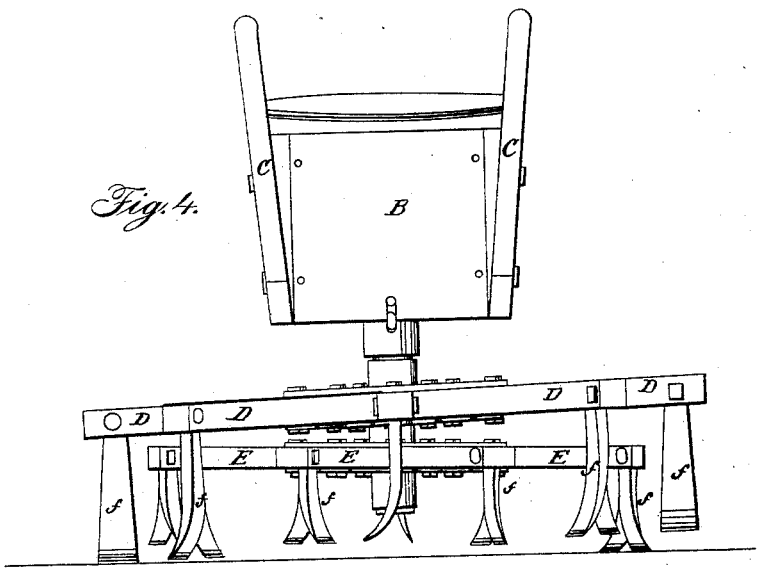
Witnesses:
R. E. Rockwell
Chas. D. Everett
Inventor:
Sidney S Hogle

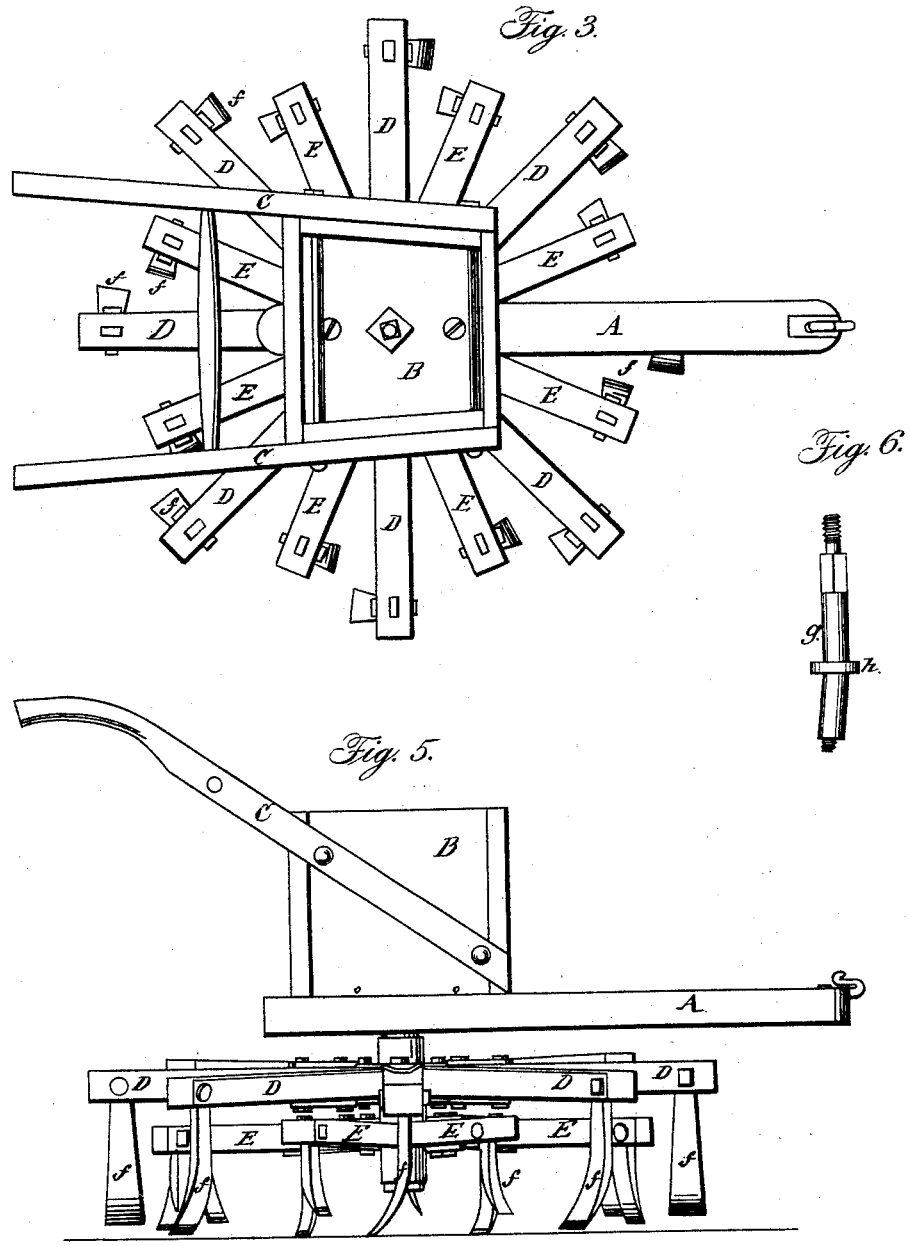

UNITED STATES PATENT OFFICE.

SIDNEY S. HOGLE, OF CLEVELAND, OHIO.

IMPROVEMENT IN ROTARY HARROWS.

Specification forming part of Letters Patent No. 30,554, dated October 30, 1860.

*To all whom it may concern:*

Be it known that I, SIDNEY S. HOGLE, of Cleveland, in the county of Cuyahoga and State of Ohio, have invented a new and useful Improvement in Rotating Harrows; and I do hereby declare that the following is a full and exact description thereof, reference being had to the accompanying drawings, making a part of this specification.

Figure 1 is a top view, and Fig. 2 a side view, of one form of my improved harrow. Fig. 3 is a top view, Fig. 4, front view, and Fig. 5 a side view, of a modified form of my said improved harrow. Fig. 6 is a view of the pivot-pin of the last-mentioned harrow detached.

The principle involved in depressing one side of a harrow-toothed wheel or frame for the purpose of causing the dragging-forward movement which may be imparted thereto to produce a positive rotary movement of the same without the aid of gearing-wheels is secured to me by the reissue of my patent of March 17, 1857. Therefore the invention which I now propose to secure by Letters Patent is the principle involved in combining two or more harrow-toothed wheels (or rotary toothed frames) with a draft-frame or a draft-beam, by which I am enabled to give the desired degree of inclination to the said harrow-toothed wheels or frames by means of inclined pivot-pins descending from the said draft-frame, or by means of obliquely-set boxes in the eyes of the said toothed wheels or toothed frames, or by means of a doubly-inclined pivot-pin, whose form is such as to adapt it to the reception of two toothed wheels or frames.

In the accompanying drawings, Figs. 1 and 2 represent a series of toothed frames, $d\ d$, as combined with a triangular frame composed of the two parts E E and F F G, which are jointed to each other in such a manner that they can readily be detached from each other whenever it may be desired to use the forward portion of said frame for cultivating purposes. The said toothed frames $d\ d$ revolve upon inclined pivot-pins that descend from the draft-frame, which pins give the proper degree of inclination to the said toothed frames. Horizontal holes may be formed in each arm of each toothed frame $d$ for the purpose of receiving the shank of a cultivator-tooth, $i$, and carrying the same, as shown in the drawings, which teeth may at any time be substituted for the pointed harrow-teeth, that are represented as occupying operative positions in the said toothed frames.

Figs. 3, 4, and 5 of the accompanying drawings represent two toothed frames, D and E, of different sizes, as being placed the one below the other upon a bent pivot-pin, $g$, which has two journals, that are separated from each other by means of a flange, $h$, which is situated at the angle in said pin, as shown in Fig 6. The central angle of the pivot-pin $g$ is sufficient in degree to incline both the toothed frames D and E in opposite positions to each other, as shown in Fig. 4, and to such a degree as to cause the forward movement of the draft-beam A to impart positive and continuous rotary motions to the said toothed frames and in opposite directions, thereby causing the laterally-drawing tendency of one of the said toothed frames to neutralize that of the other, and consequently enabling this arrangement of a rotary harrow to be safely used as a cultivator between rows of corn or other crops.

The pivot-pin $g$ may be combined with the draft-beam A by means of a screw shank and nut, or by any other suitable means. The radial arms of the toothed frames D and E may be armed either with pointed harrow-teeth or with cultivator-teeth of any desired shape.

The handles C C, which are combined with the draft-beam A of my improved harrow, enable the same to be accurately guided when the said implement is used as a cultivator. The handles C C, which are combined with the portion E E of the triangular frame E E and F F G, Figs. 1 and 2, also serve the purpose of guiding said frame when it is used as a cultivator.

The box B, which is combined with the beam A, is intended to receive any additional weight that may at any time be required upon the harrow or cultivator.

What I claim as my invention, and desire to secure by Letters Patent, is—

Combining two or more harrow-toothed wheels or frames with a draft-frame or with a draft-beam in such a manner as to cause the forward movement of said draft frame or beam to impart positive rotary movements to the said harrow-toothed wheels or frames, substantially as herein set forth.

SIDNEY S. HOGLE.

Witnesses:
R. E. ROCKWELL,
CHAS. D. EVERETT.